United States Patent
Adas et al.

(10) Patent No.: US 8,393,064 B2
(45) Date of Patent: *Mar. 12, 2013

(54) WINDSHIELD INSTALLATION DEVICE AND METHOD OF USE

(75) Inventors: Jeff Adas, Beloit, WI (US); Steve Coyle, Eau Claire, WI (US)

(73) Assignee: Aegis Tools International, Inc., Madison, WI (US)

( * ) Notice: Subject to any disclaimer, the term of this patent is extended or adjusted under 35 U.S.C. 154(b) by 522 days.

This patent is subject to a terminal disclaimer.

(21) Appl. No.: 12/611,271

(22) Filed: Nov. 3, 2009

(65) Prior Publication Data

US 2010/0045063 A1 Feb. 25, 2010

Related U.S. Application Data

(63) Continuation of application No. 12/012,031, filed on Jan. 29, 2008, now Pat. No. 7,610,666, which is a continuation of application No. 11/274,734, filed on Nov. 14, 2005, now Pat. No. 7,322,092.

(51) Int. Cl.
*B23Q 3/00* (2006.01)
*B60J 1/00* (2006.01)

(52) U.S. Cl. ...... 29/281.4; 29/281.1; 29/464; 296/190.1

(58) Field of Classification Search .................. 29/281.1, 29/281.4, 402.03, 402.08, 464, 468, 559; 296/97.9

See application file for complete search history.

(56) References Cited

U.S. PATENT DOCUMENTS

| | | | |
|---|---|---|---|
| 3,020,017 A | 2/1962 | Watson | |
| 3,620,524 A | 11/1971 | Czompi | |
| 4,453,303 A | 6/1984 | Leddet | |
| 4,670,974 A | 6/1987 | Antoszewski et al. | |
| 4,852,237 A | 8/1989 | Tradt et al. | |
| 4,998,711 A | 3/1991 | Borg | |
| 5,085,415 A | 2/1992 | Shaver | |
| 5,112,092 A | 5/1992 | Pucci | |
| 5,190,604 A | 3/1993 | Shaver | |
| 5,416,965 A | 5/1995 | Mayhugh | |
| 5,429,253 A | 7/1995 | McNett | |
| 5,479,689 A | 1/1996 | Schmit et al. | |
| 5,525,027 A | 6/1996 | Jinno et al. | |

(Continued)

FOREIGN PATENT DOCUMENTS

| | | |
|---|---|---|
| DE | 202004013157 | 1/2006 |
| EP | 2316678 | 2/2003 |

(Continued)

OTHER PUBLICATIONS

Rosenbaum, Matthew, A., "Ford Econoline Windshield Two-Man Set Gone Solo" from Glasslinks, auto glass Tech Center Knowledge Base, http://glasslinks.com/tips.solo_set.htm, Jun. 11, 2000.

(Continued)

*Primary Examiner* — Alexander P Taousakis
(74) *Attorney, Agent, or Firm* — Michael Best & Friedrich LLP

(57) ABSTRACT

An installation device for installing a windshield in a vehicle. The device includes a pivot assembly including a pair of suction cups that attach to the door glass of a vehicle door, and a depending member that extends upwardly and forwardly adjacent a windshield opening. A support assembly includes a pair of suction cups that attach to a windshield, and a support rod that is axially and rotatably moveable with respect to the suction cups. The support rod includes an end that pivots on the depending member of the pivot assembly. The device moveably supports the windshield such that a single technician can install the windshield on a vehicle.

15 Claims, 4 Drawing Sheets

U.S. PATENT DOCUMENTS

| | | | |
|---|---|---|---|
| 5,556,505 | A | 9/1996 | Hill |
| 5,622,093 | A | 4/1997 | Hutchins |
| 5,772,823 | A | 6/1998 | Rusch et al. |
| 5,826,342 | A | 10/1998 | Zuro |
| 5,953,802 | A | 9/1999 | Radzio |
| 6,101,702 | A | 8/2000 | Claycomb et al. |
| 6,237,216 | B1 | 5/2001 | Jin |
| 6,543,117 | B1 | 4/2003 | Claycomb et al. |
| 6,584,925 | B2 | 7/2003 | Kapsner et al. |
| 6,616,800 | B2 | 9/2003 | Eriksson |
| 7,039,995 | B2 | 5/2006 | Thompson |
| 7,216,411 | B1 | 5/2007 | Mayhugh |
| 7,322,092 | B2 | 1/2008 | Adas et al. |
| 7,610,666 | B2 | 11/2009 | Adas et al. |
| 2004/0003488 | A1 | 1/2004 | Thompson |
| 2006/0156533 | A1 | 7/2006 | Mayhugh |
| 2007/0108790 | A1* | 5/2007 | Adas et al. ............... 296/97.9 |
| 2008/0122245 | A1* | 5/2008 | Adas et al. ............... 296/97.9 |

FOREIGN PATENT DOCUMENTS

| | | |
|---|---|---|
| EP | 1785300 A2 | 5/2007 |
| EP | 1826044 | 8/2007 |
| EP | 1849634 | 10/2007 |
| FR | 2828826 | 2/2003 |
| FR | 2952023 | 5/2011 |
| GB | 2273517 | 6/1994 |
| JP | H06065577 | 9/1994 |
| JP | 2002503558 | 2/2002 |
| WO | 9942244 | 2/1999 |

OTHER PUBLICATIONS

User Review lil-Buddy windshield installation tool, AutoGlass, Sep.-Oct. 2005, p. 30, vol. 16, No. 5.

Industry Products Brand New at the Expo, AutoGlass, Jul.-Aug. 2005, p. 56.

eBay Motors buying page for lil-Buddy auto glass windshield installation tool NIB, auction started Sep. 29, 2005.

European Extended Search Report for European Patent Application No. 08746643.9 dated Oct. 7, 2011.

International Search Report and Written Opinion, International Application No. PCT/US2008/061259, dated Dec. 31, 2008.

European Search Report and Opinion, European Patent Application No. 06255392.0, dated Mar. 26, 2008.

European Office Action, European Patent Application No. 06255392.0, dated Jan. 24, 2011.

Office action for Japanese Patent Application No. 2011-506247 dated Jan. 4, 2013.

* cited by examiner

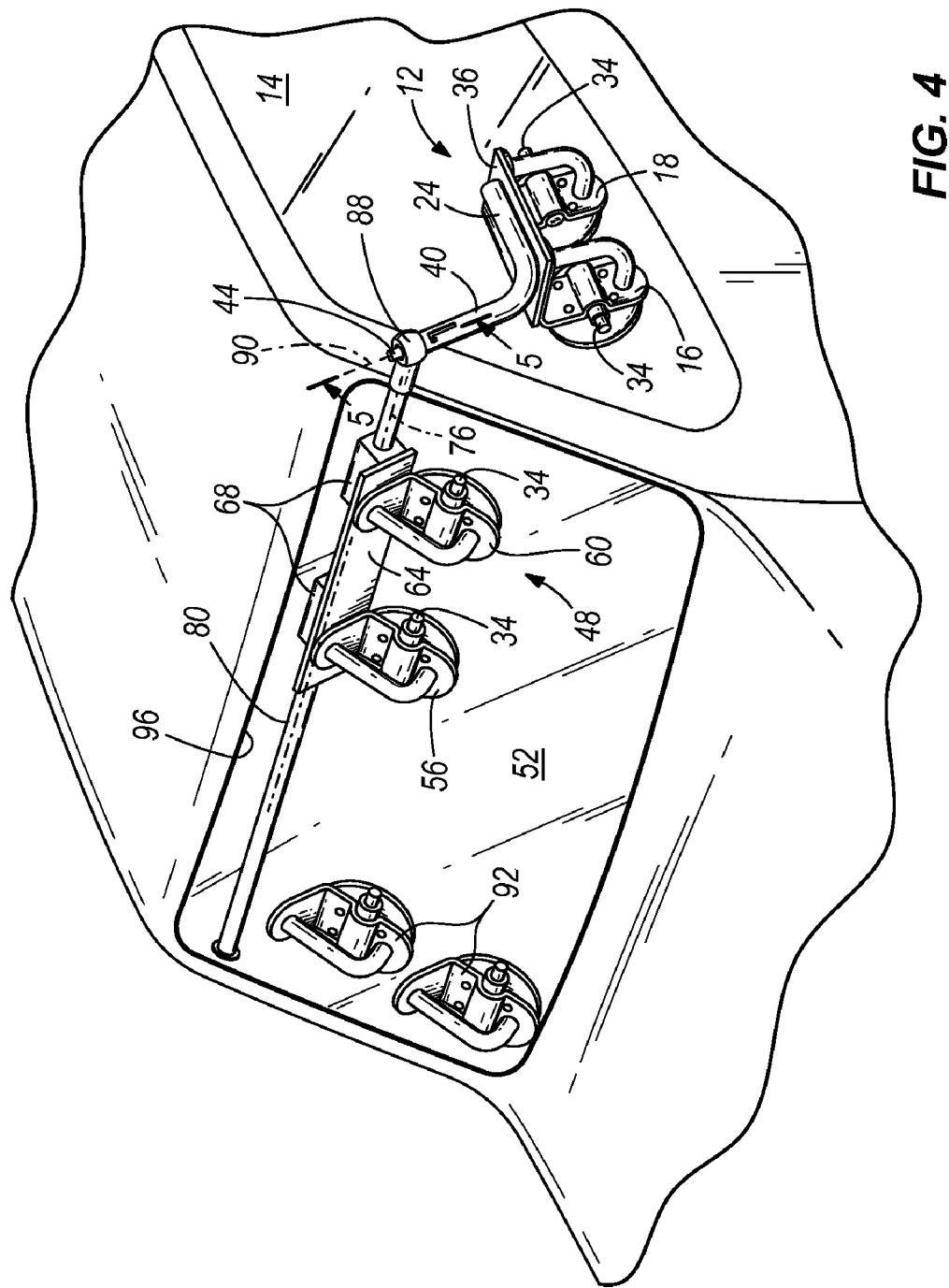

WINDSHIELD INSTALLATION DEVICE AND METHOD OF USE

RELATED APPLICATIONS

This application claims priority to U.S. patent application Ser. No. 12/012,031, filed on Jan. 29, 2008, which is a continuation of U.S. patent application Ser. No. 11/274,734, filed on Nov. 14, 2005. The entire contents of these applications are incorporated by reference herein.

BACKGROUND

Installing a windshield on an automotive vehicle requires precise placement of the windshield. Given the weight and considerable size of windshields, and the arrangement of most cars, installing a windshield is often a two-person job that requires individuals on both the driver's and passenger's side of the vehicle. Many businesses that provide auto glass repair and replacement provide on site service, in which a service technician or a team of technicians travel to the customer's vehicle for repair or replacement of the windshield wherever the vehicle happens to be located. Providing on site service in this manner provides a high level of convenience to the customer and can be a distinct competitive advantage for glass replacement businesses.

SUMMARY

The invention provides a windshield installation device including a pivot assembly that attaches to a side window of a vehicle, and a support assembly that attaches to a windshield to be installed. The pivot assembly includes first and second suction members that are coupled to the side window. A pivot member includes a first portion coupled to the first and second suction members and a depending portion that extends generally upwardly and forwardly from the suction members. The support assembly includes third and fourth suction members that are coupled to the windshield. The third and fourth suction members are coupled to one another and at least one of the suction members defines a support bore. The support bore receives an elongated support rod that is rotatable and axially moveable within the support bore. The support member includes an end portion that pivotally engages the depending portion of the pivot member such that the windshield is at least partially supported by the pivot assembly during windshield installation. The combination of support and movement afforded by the pivotal engagement between the support rod and the pivot member, and the rotational and axially movable engagement between the support rod and the support bore allows the windshield to be installed by a single technician.

Other aspects of the invention will become apparent by consideration of the detailed description and accompanying drawings.

BRIEF DESCRIPTION OF THE DRAWINGS

FIG. 4 is a perspective view of the windshield installation device with the windshield positioned for installation in the vehicle.

Figure 1:
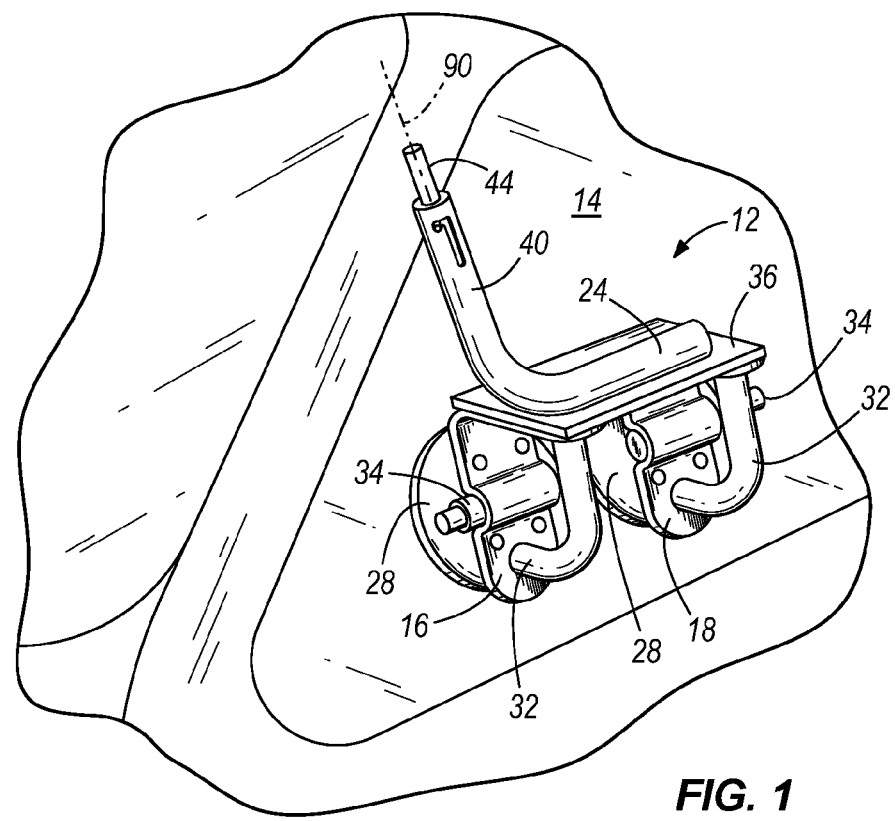
FIG. 1 is a perspective view of a pivot portion of a windshield installation device embodying the invention.

Before any embodiments of the invention are explained in detail, it is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

The figures illustrate a windshield installation device 10 of the present invention. With reference to FIG. 1, the device 10 includes a pivot assembly 12 that attaches to a side window 14 of a vehicle. The pivot assembly 12 includes a first suction member 16, a second suction member 18, and a pivot member 24 coupled to the first and second suction members 16, 18. Each suction member 16, 18 includes a resilient cup 28, a handle 32 coupled to the cup 28, and a manually actuated vacuum device 34 that removes air from between the cup 28 and a surface to which the suction member is being attached (e.g. the side window 14). The construction of the suction members 16, 18 and the vacuum device 34 are more fully described in commonly assigned U.S. Pat. No. 5,772,823, the contents of which are incorporated by reference herein. A plate 36 is coupled to the handles 32 and couples the suction members 16, 18 to one another. The plate 36 can include upturned side edges in some embodiments. The pivot member 24 is substantially L-shaped and includes a first portion that is coupled to the plate 36 and a depending portion 40 that extends away from the plate 36 and which defines a reduced-diameter cylindrical portion 44 at one end. The reduced-diameter cylindrical portion 44 is operable to retract inside of the depending portion 40.

Figure 2:
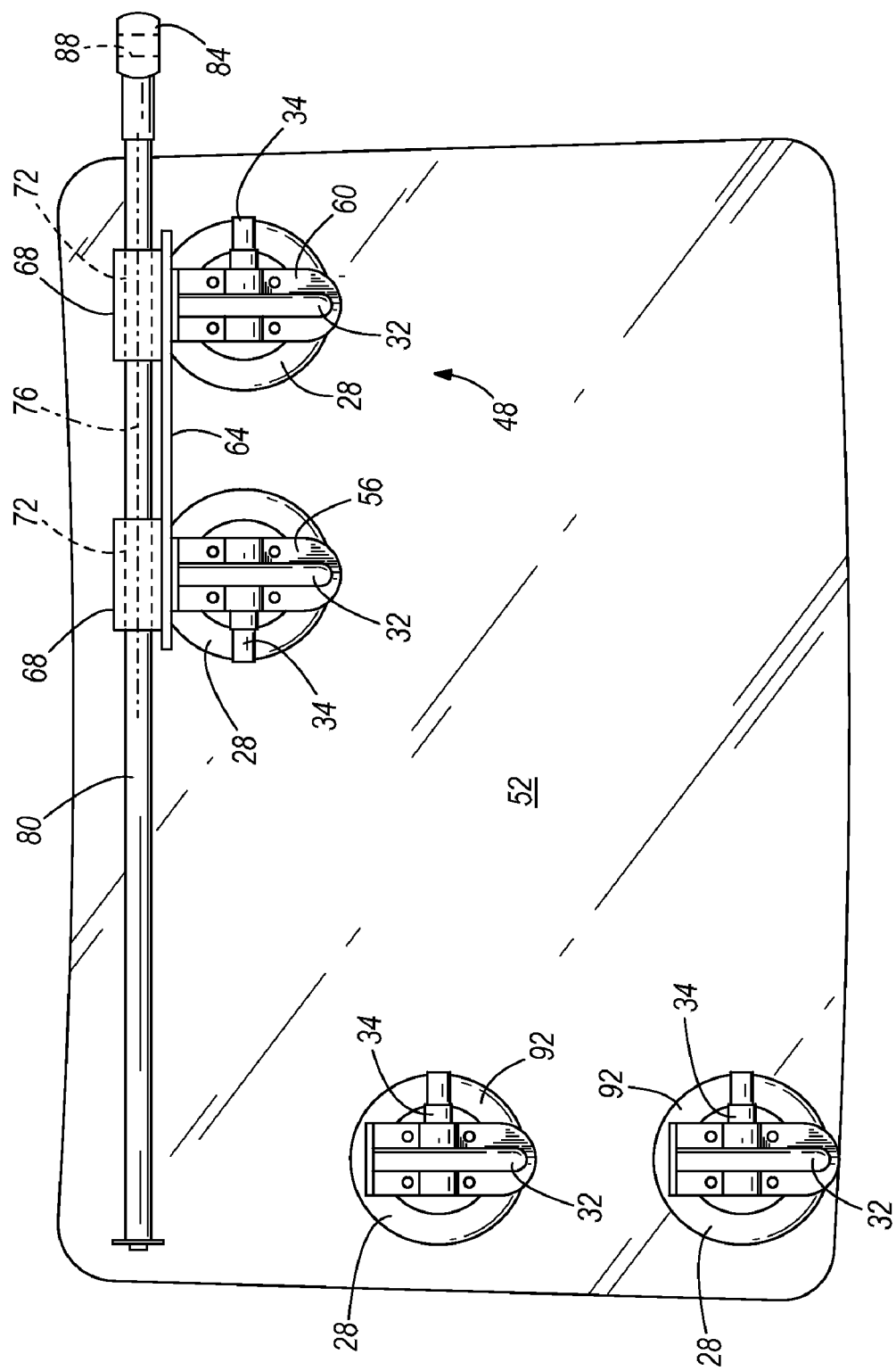
FIG. 2 is a front view of a support portion of the windshield installation device coupled to a windshield.

FIG. 2 illustrates a support assembly 48 of the windshield installation device coupled to a windshield 52 that is to be installed on the vehicle. The support assembly 48 includes a third suction member 56 and a fourth suction member 60, both of which are configured similarly to the first and second suction members 16, 18. A channel or plate 64 couples the third and fourth suction members 56, 60 to one another, and support blocks 68 are coupled to the plate 64. The third and fourth suction members 56, 60 are configured such that a first plane defined by the plate 64 is at an obtuse angle with respect to a second plane defined generally by the windshield 52.

Figure 5:
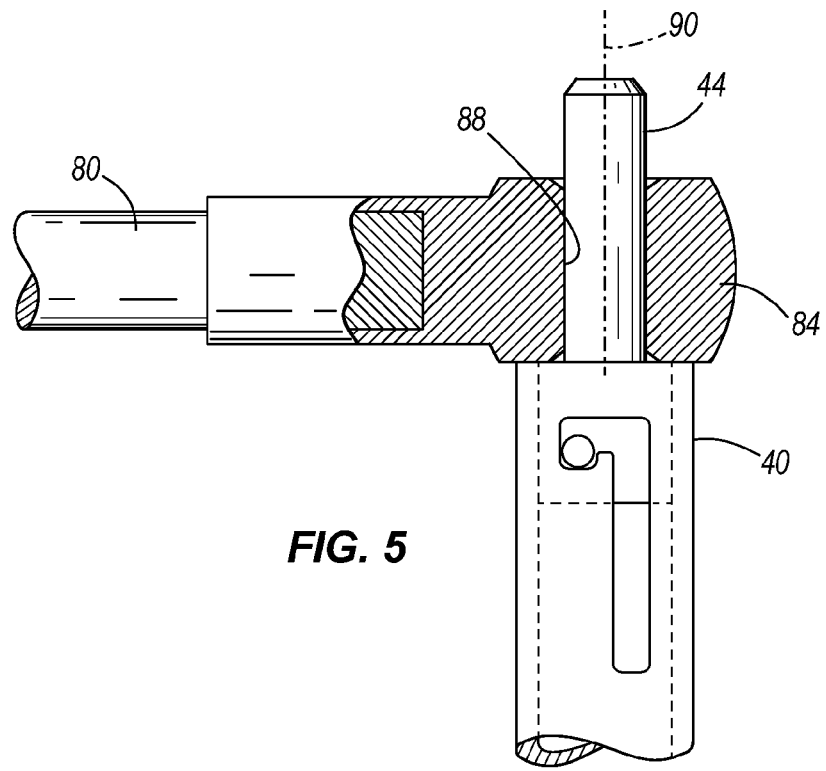
FIG. 5 is a section view taken along line 5-5 of FIG. 4.

The support blocks 68 each define a bore 72, and the bores 72 are substantially axially aligned with one another and define an axis 76. A generally cylindrical elongated support rod 80 extends through the bores 72 and is both rotatable about the axis 76 and axially moveable with respect to the support blocks 68. The support blocks 68 may include bushings and/or bearings to facilitate smooth sliding and rotation of the support rod 80. The support rod 80 includes an end portion 84 having external threads adapted to receive a connector 86. The connector 86 includes an opening 88 adapted to receive the cylindrical portion 44 of the pivot member 24 (see FIG. 5). The support rod 80 and pivot member 24 are therefore pivotable with respect to one another about an axis 90 defined by the cylindrical portion 44. As illustrated, additional suction members 92 can be coupled to the windshield 52 to facilitate handling of the windshield 52 during windshield installation.

Figure 3:
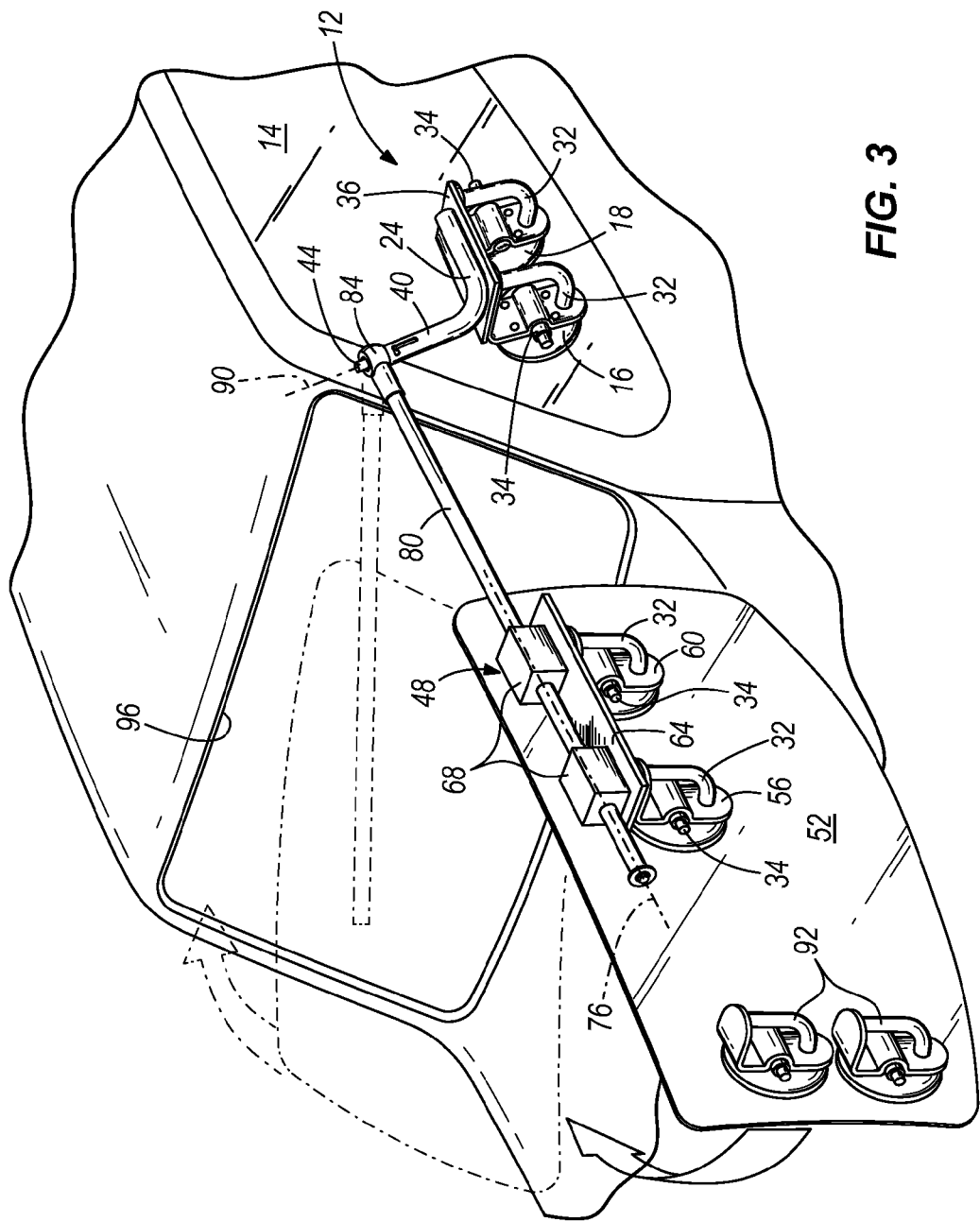
FIG. 3 is a perspective view of the windshield installation device supporting a windshield for installation in a vehicle.

Referring also to FIGS. 3 and 4, the support assembly 48 and the additional suction members 92 are coupled to the windshield 52, and the pivot assembly 12 is coupled to the side window 14, all by way of manually operating the vacuum devices 34. The pivot assembly 12 is positioned on the side window 14 so that the depending portion 40 extends upwardly and forwardly from the plate 36, adjacent a windshield opening 96. The support rod 80 is moved axially within the support blocks 68 so that the end portion 84 extends past a side edge of the windshield 52. The windshield 52 is manually lifted using the handles 32 of the third and/or fourth suction members 56, 60 and/or the additional suction members 92, and the end portion 84 of the support rod 80 is positioned over the cylindrical portion 44 of the pivot member 24. The windshield 52 is thereafter at least partially supported by the pivot member 24 and can be pivoted about the axis 90 of the cylindrical portion 44.

With the support rod 80 engaged with the pivot member 24, the windshield 52 is manipulated from the position illustrated in FIG. 3 into an installation position over the windshield opening 96 as illustrated in FIG. 4. Manipulating the windshield 52 in this manner will generally include pivoting the windshield 52 and the support assembly 48 about the pivot member 24, sliding the support rod 80 axially within the support blocks 68, and also rotating the windshield 52 about the axis 76. The pivotal engagement between the support rod 80 and the pivot assembly 12, along with the sliding and rotating engagement between the support rod 80 and the support blocks 68 movably supports the windshield 52 in such a way that the windshield 52 can be installed by a single technician. More specifically, the technician can first engage the end portion 84 with the pivot member 24, and can then grasp the additional suction members 92 while walking around the forward portion of the vehicle, thereby pivoting the support rod 80 about the pivot member 24. From the opposite side of the vehicle as the pivot assembly 12, the windshield 52 can be rotated about the axis 76 and moved axially along the support rod 80 until the windshield 52 is properly positioned above the windshield opening 96.

Although the installation device 10 is shown and described herein as facilitating installation of a windshield in an automotive vehicle, it should be appreciated that the device 10 can be utilized in a variety of other applications in which it is desired to at least partially support an object in a moveable manner to facilitate installation or general manipulation thereof.

Various features of the invention are set forth in the following claims.

What is claimed is:

1. A windshield installation device for a vehicle windshield, the vehicle including a side window, the device comprising:
    a first assembly configured to attach to a side window of a vehicle, the first assembly including a first support member having a first end and a second end and a pin that is retractable with respect to one of the first end and the second end of the first support member;
    a second assembly configured to attach to a windshield of the vehicle, the second assembly including a second support member having a bore configured to receive a rod, the rod having a first end and a second end, one of the first end and the second end of the rod configured to be removably coupled to the pin and pivot with respect to the first support member.

2. The windshield installation device of claim 1 wherein the rod is configured to slide within the bore.

3. The windshield installation device of claim 1 wherein the second support member includes at least one bearing configured to allow the rod to slide within the bore.

4. The windshield installation device of claim 1 wherein the first assembly includes a suction member coupled to the first support member.

5. The windshield installation device of claim 1 wherein the second assembly includes a suction member coupled to the second support member and configured to attach to the windshield.

6. The windshield installation device of claim 1 wherein the first support member includes a first member and a second member oriented substantially transverse to the first member.

7. The windshield installation device of claim 1 wherein the second support member affords axial and rotational movement of the rod within the bore.

8. The windshield installation device of claim 1 wherein the rod and the bore include a substantially circular cross-section.

9. A windshield installation device for a vehicle windshield, the vehicle including a windshield opening and a side window, the device comprising:
    a first assembly including a first support member and a pin extending from the first support member, the pin configured to retract with respect to the first support member, the first support member configured to attach to a side window of the vehicle; and
    a second assembly configured to attach to the windshield, the second assembly configured to pivot with respect to the retractable pin to position the windshield adjacent to the windshield opening.

10. The windshield installation device of claim 9, wherein the first assembly includes a suction member coupled to the first support member.

11. The windshield installation device of claim 9, wherein the second assembly includes a suction member.

12. The windshield installation device of claim 11, wherein the second assembly includes a rod coupled to the suction member and the pin.

13. The windshield installation device of claim 12, wherein the second assembly includes a second support member coupled to the suction member, the second support member defining a bore capable of receiving the rod, and wherein the second support member is configured to slide along the rod.

14. The windshield installation device of claim 13, wherein the bore includes at least one bearing.

15. The windshield installation device of claim 9 wherein the first support member includes a first member and a second member oriented substantially transverse to the first member, and wherein the pin extends from one of the first member and the second member.

* * * * *